(12) United States Patent
Chen et al.

(10) Patent No.: US 12,438,798 B2
(45) Date of Patent: Oct. 7, 2025

(54) NETWORK TRACE CATEGORIZATION IN CONTENT DELIVERY

(71) Applicant: Beijing YoJaJa Software Technology Development Co., Ltd., Beijing (CN)

(72) Inventors: Si Chen, Beijing (CN); Tongyu Dai, Beijing (CN); Lemei Huang, Beijing (CN); Chenyu Tian, Beijing (CN)

(73) Assignee: Beijing YoJaJa Software Technology Development Co., Ltd., Beijing (CN)

( * ) Notice: Subject to any disclaimer, the term of this patent is extended or adjusted under 35 U.S.C. 154(b) by 150 days.

(21) Appl. No.: 18/404,772

(22) Filed: Jan. 4, 2024

(65) Prior Publication Data

US 2025/0211511 A1   Jun. 26, 2025

Related U.S. Application Data

(63) Continuation of application No. PCT/CN2023/140604, filed on Dec. 21, 2023.

(51) Int. Cl.
*H04L 43/062* (2022.01)
*H04L 43/10* (2022.01)
*H04L 43/16* (2022.01)

(52) U.S. Cl.
CPC ............ *H04L 43/10* (2013.01); *H04L 43/062* (2013.01); *H04L 43/16* (2013.01)

(58) Field of Classification Search
CPC ........ H04L 43/10; H04L 43/062; H04L 43/16
See application file for complete search history.

(56) References Cited

U.S. PATENT DOCUMENTS

2019/0387265 A1\* 12/2019 Mueller ............ H04N 21/2402
2023/0403434 A1\* 12/2023 Kondratovsky ... H04N 21/8456

\* cited by examiner

*Primary Examiner* — Kamal M Hossain
(74) *Attorney, Agent, or Firm* — Kwan & Olynick LLP

(57) ABSTRACT

In some embodiments, a method receives a network trace from a playback session of a delivery of content being managed by a content management system. The network trace is decomposed into a first sub-trace and a second sub-trace based on a threshold. The threshold is used to divide the network trace into the first sub-trace and the second sub-trace. A value is extracted for a feature for the network trace based on the first sub-trace. The method classifies the network trace into a category based on the value and performs an action based on the category for the content management system.

18 Claims, 10 Drawing Sheets

NETWORK TRACE CATEGORIZATION IN CONTENT DELIVERY

CROSS REFERENCE TO RELATED APPLICATIONS

This application is a continuation application and, pursuant to 35 U.S.C. § 120, is entitled to and claims the benefit of earlier filed PCT application App. No. PCT/CN2023/140604, filed Dec. 21, 2023, entitled "NETWORK TRACE CATEGORIZATION IN CONTENT DELIVERY", the content of which is incorporated herein by reference in its entirety for all purposes.

BACKGROUND

Content streaming is a popular way of consuming content, such as videos. The quality of the viewing experience may be critical to the success of service providers that are providing a service for the content streaming. However, the quality of the viewing experience is heavily influenced by network conditions that exist between a client that is playing back the content and a server of a content delivery network that is delivering the content. Constant fluctuations in network conditions make it challenging to ensure a consistently high quality viewing experience. An adaptive bitrate algorithm may be used to adapt to changing network conditions in real time. The adaptive bitrate algorithms rely on short term network measurements to estimate the current bandwidth. However, the short-term network measurements may not provide enough insight into the estimation, which may result in less accurate estimations of current bandwidth.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
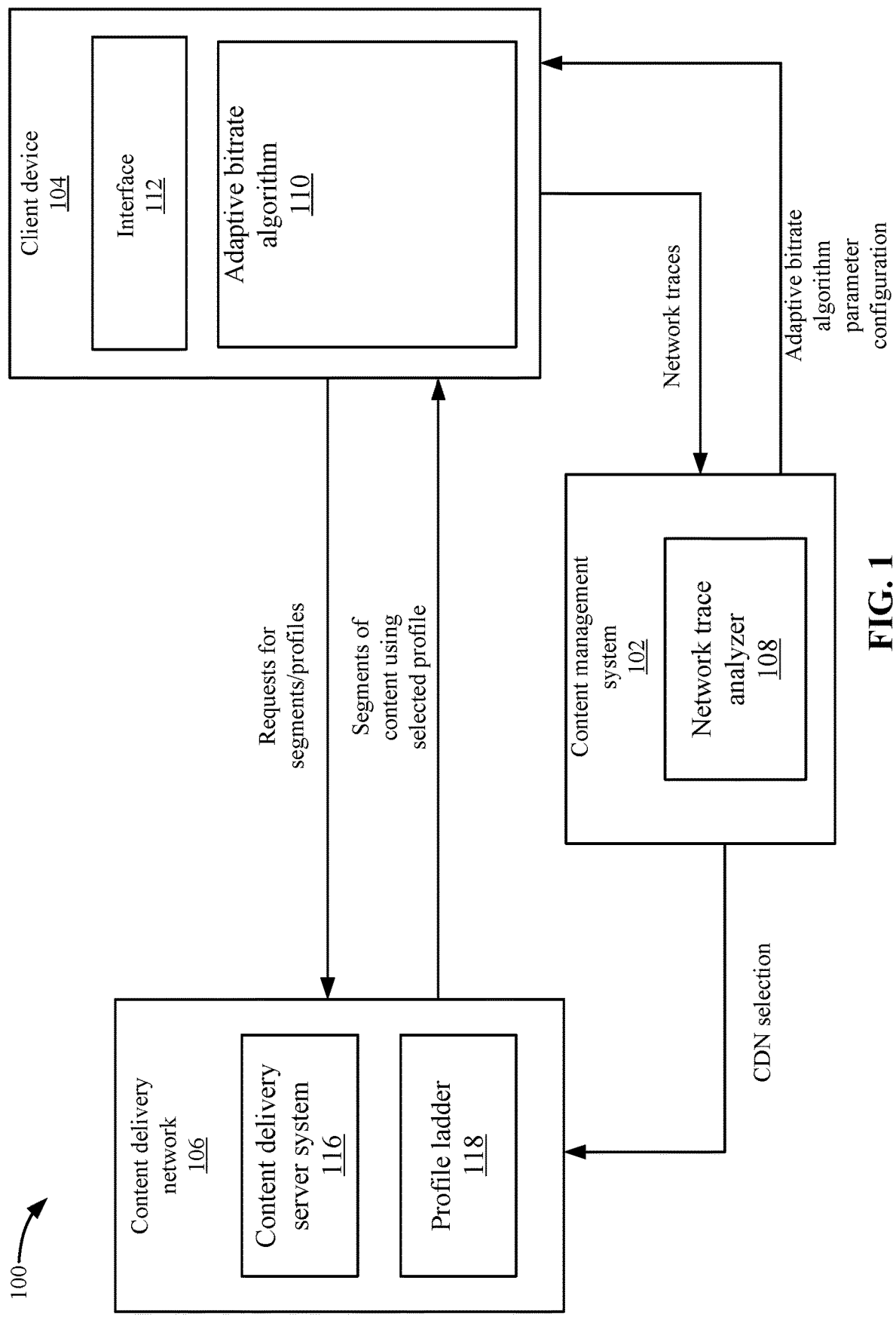
FIG. 1 depicts a simplified system for analyzing a network trace for content delivery according to some embodiments.

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system may categorize content delivery information, such as information received from a network trace of the delivery of content. The network trace may describe network conditions at different points in time in a playback session of content. The categorization may decompose information from the network trace into two components or sub-traces, such as a high frequency sub-trace and a low frequency sub-trace. The system may use the low frequency sub-trace, which may be more related to the quality of service (QOS) that is experienced during the content delivery compared to the high frequency sub-trace, and not use the high frequency sub-trace in the analysis. Then, the system may determine sub-segments of the low frequency sub-trace using a change point detection process to determine when network changes occur. The system may extract features from the sub-segments, and use the features to categorize the network trace. The system may then perform an action using the categorization. For example, the system may adjust the parameters of processes that are used by the content delivery system, such as adjusting parameters in a content delivery network (CDN) selection process or adjusting parameters in the adaptive bitrate algorithm that is used during content delivery. Also, the categorization improves the analysis of the network traces. For example, a visualization of the categorization for the network trace may provide information of the network conditions that are experienced in one or more network traces.

The above process improves the content delivery system. The decomposition of the network trace into a low frequency sub-trace and a high frequency sub-trace may provide more accurate information that may directly impact the quality of service because the low frequency sub-trace may have a more direct connection to quality of service. For example, the high frequency sub-trace may fluctuate very fast, which may not affect playback conditions, and is not used. However, the gradual change in the low frequency sub-trace may affect the playback conditions, such as experiencing low bandwidth for a longer time period may cause the buffer to not have enough data to support smooth playback of the content. Accordingly, the actions that can be taken may be improved. The analysis may also be performed faster because less information may be analyzed by using the low frequency sub-trace and not the high frequency sub-trace. The result is determined faster because the high frequency sub-trace is removed from the analysis before categorization. Also, less computing resources may be used because the process that is performing the categorization does not need to take into account the high frequency sub-trace, which might have obfuscated the effects of the low frequency sub-trace.

System

FIG. 1 depicts a simplified system 100 for analyzing a network trace for content delivery according to some embodiments. System 100 includes a content management system 102, a client device 104, and a content delivery network 106. Content management system 102, content delivery network 106, and client device 104 may be implemented using one or more computing devices. Also, although single instances of content management system 102, content delivery network 106, and client device 104 are shown, it will be understood that system 100 may include more than one content management system 102, content delivery network 106, or client device 104. For instance, content management system 102 may communicate with multiple client devices 104, and content delivery network 106 may send content to client devices 104 via multiple servers, etc. Also, even though content management system 102, content delivery network 106, and client device 104 are shown as separate entities, the functions performed by them may be distributed between them or to other entities.

Content management system 102 may provide a content delivery service that allows client device 104 to request content, such as videos on-demand or live videos from live television, audio, etc. Video may be used as an example for discussion purposes, but other content may be used. Content management system 102 may provide an application to client device 104 that can display an interface 112 at client device 104. A user account may log onto the application to access the content delivery service. Then, content management system 102 may receive a request from client device 104 and process the request to allow client device 104 to stream an instance of content.

Client device 104 may include a computing device that can playback content in interface 112, such as via a media player (not shown). Client device 104 may include a mobile phone, smartphone, set top box, television, living room device, tablet device, etc. Client devices 104 may operate on a platform, which may be classified by a type of device that operates on the platform. For example, platforms include mobile device platforms, living room device platforms, etc. A user account that is used by a user may use client device 104 to access the video delivery service. For example, the user account may log in to the content delivery service to identify information for the user account. When client device 104 receives a request for an instance of content from the user account, client device 104 may send the request to content management system 102 for that instance of content.

In the process to start playback of an instance of content, content management system 102 may receive the request for the instance of content from client device 104. Content management system 102 may select a content delivery network 106 and provide the information to content delivery network 106 or client device 104 to allow the instance of content to be streamed between content delivery network 106 and client device 104. Content management system 102 may also provide different information, such as a playback configuration and a media presentation description. The playback configuration may include available profiles for streaming, etc. The media presentation description may include information on profiles that are available, segment duration, and other characteristics of the video.

Content delivery network 106 includes servers that can deliver content to client device 104. For example, a content delivery server system 116 may include one or more servers that can deliver the instance of content to client device 104. In some embodiments, content delivery server system 116 delivers segments of video to client device 104. The segments may be a portion of the video, such as six seconds of the video. A video may be encoded in multiple profiles that correspond to different levels, which may be different levels of bitrates or quality. The multiple profiles may be referred to as a profile ladder 118. Each video may have an associated profile ladder 118 of profiles that have different levels of bitrates or quality. The profiles may be classified at different levels and each level may be associated with a different characteristic. For example, each level may be associated with a different bitrate, such as 400 kilobytes per second (kbps), 650 kbps, 1000 kbps, 1500 kbps, . . . , 12000 kbps. However, a level may be associated with another characteristic, such as a quality characteristic (e.g., resolution). For example, a level may be combination of bitrate and resolution. In some embodiments, the level may be determined based on how the video is encoded for the level, such as the video is encoded at the 400 kbps level for a profile associated with 400 kbps. The profile levels may be referred to as higher or lower, with profiles that have higher bitrates or quality being rated higher than profiles with lower bitrates or quality. Client device 104 may request a segment of video from one of the profile levels based on current playback conditions. The playback conditions may be any conditions that are experienced based on the playback of a video, such as available bandwidth, buffer length, etc. For example, client device 104 may use an adaptive bitrate algorithm 110 to select the profile for the video based on the current available bandwidth, buffer length, and other playback conditions.

Client device 104 may playback an instance of content during a playback session. Adaptive bitrate algorithm 110 may analyze current playback conditions (e.g., current available bandwidth, buffer length, etc.) during the playback session of an instance of content, such as a video, to select a profile from a profile ladder 118 that is associated with the instance of content. Adaptive bitrate algorithm 110 may be configured with parameter values that are used by the algorithm to select a profile from profile ladder 118 based on playback conditions.

A network trace analyzer 108 may receive network trace samples that describe the delivery of content from content delivery network 106 to client device 104 at a particular time or a set of times. The network trace samples may include metric values for metrics that are based on network conditions, such as bandwidth, round trip time, etc. Bandwidth may be the available bandwidth that is measured for the delivery of content. The round trip time may be the amount of time it takes a communication between content delivery network 106 and client device 104 to make a round trip, such as from client device 104 to content delivery network 106 and back to client device 104, or vice versa. In some embodiments, the network trace samples may be received from client device 104, but could be received from other devices such as content delivery network 106, or other network devices. The network trace samples may be a record that captures the network conditions experienced during a playback session. For example, when client device 104 requests the delivery of an instance of content, network trace samples for the session in which the delivery of the content occurs are received at network trace analyzer 108. Network trace analyzer 108 may generate a network trace for the session from the network trace samples. The network trace may describe the network conditions that were experienced during the session.

Network trace analyzer 108 may analyze the network trace. For example, network trace analyzer 108 may decompose one or more metrics from the network trace into multiple components. For example, if bandwidth is being used, network trace analyzer 108 may decompose the network trace into a high frequency sub-trace and a low frequency sub-trace. Network trace analyzer 108 may analyze the low frequency sub-trace because the low frequency sub-trace may be more relevant to the quality of service that is experienced during the content delivery. For example, the high frequency sub-trace may include large, fast variations in a metric that is measured in the network trace. For example, the available bandwidth may go down and back up immediately after. The high frequency sub-trace may vary around a value, such as zero, over time. The low frequency sub-trace may include smaller changes that may gradually change over time. The low frequency sub-trace may affect quality of service because the changes that occur may be gradual, which affects the quality of service that is experienced over time. In contrast, the sharp changes in the high frequency sub-trace may occur in a short amount of time that may not affect the quality of service performance as much as the low frequency changes over time. For example, the very quick change in bandwidth in the high frequency sub-trace may not affect the buffer length during playback. However, the gradual change of the low frequency sub-trace to a lower bandwidth may affect the buffer length by lowering the amount of data being stored in the buffer over time, which may cause a rebuffer when the buffer length is reduced. A rebuffer may be where the media player does not have enough content to playback from the buffer to provide smooth playback during the session. The media player must wait until the buffer is refilled to restart playback. However, the sharp fluctuation in bandwidth in the high frequency sub-trace may not affect the amount of data being stored in the buffer very much.

To perform the analysis, network trace analyzer 108 may categorize the low frequency sub-trace. For example, network trace analyzer 108 may determine sub-segments of the low frequency sub-trace based on detecting change points. A change point may be where the low frequency sub-trace changes by a certain amount before and after the point. The determination of sub-segments may determine portions of the network trace that have stable characteristics. The values of the sub-segments may be used to determine features to perform the categorization for a network trace as will be described below. Although change point analysis is described, it may be possible to categorize the network trace without determining sub-segments via the change point analysis.

Network trace analyzer 108 then analyzes features of the network trace to classify the network trace into categories. As will be described in more detail below, the network trace may be categorized in different levels for respective categories, such as bandwidth level, bandwidth stability, and round trip time type. Based on the categorizations, network trace analyzer 108 may perform an action. For example, the action may include adjusting parameters in a process used in the content delivery process, such as selecting a content delivery network or adjusting parameters in adaptive bitrate algorithm 110.

Conventionally, the parameter values may have been fixed for some content delivery processes. However, adaptive bitrate algorithm 110 may dynamically adjust the parameter values based on the categorization. For example, content management system 102 may adjust the parameter values of adaptive bitrate algorithm 110 based on a categorization indicates different network conditions are being experienced. In some embodiments, the adjustment may be during a playback session or after a playback session. Then, adaptive bitrate algorithm 110 may select a profile to use to send requests for segments of content using the adjusted parameters. Also, content management system 102 may adjust parameters of the content delivery network selection process. Then, when a request is received for an instance of content, content management system 102 uses the adjusted parameters to select a content delivery network 106 to select for the request.

The following will describe the analysis of the network trace, the change point detection, the categorization, and then the performing of actions based on the categorization in more detail.

Network Trace Analysis

Figure 2:
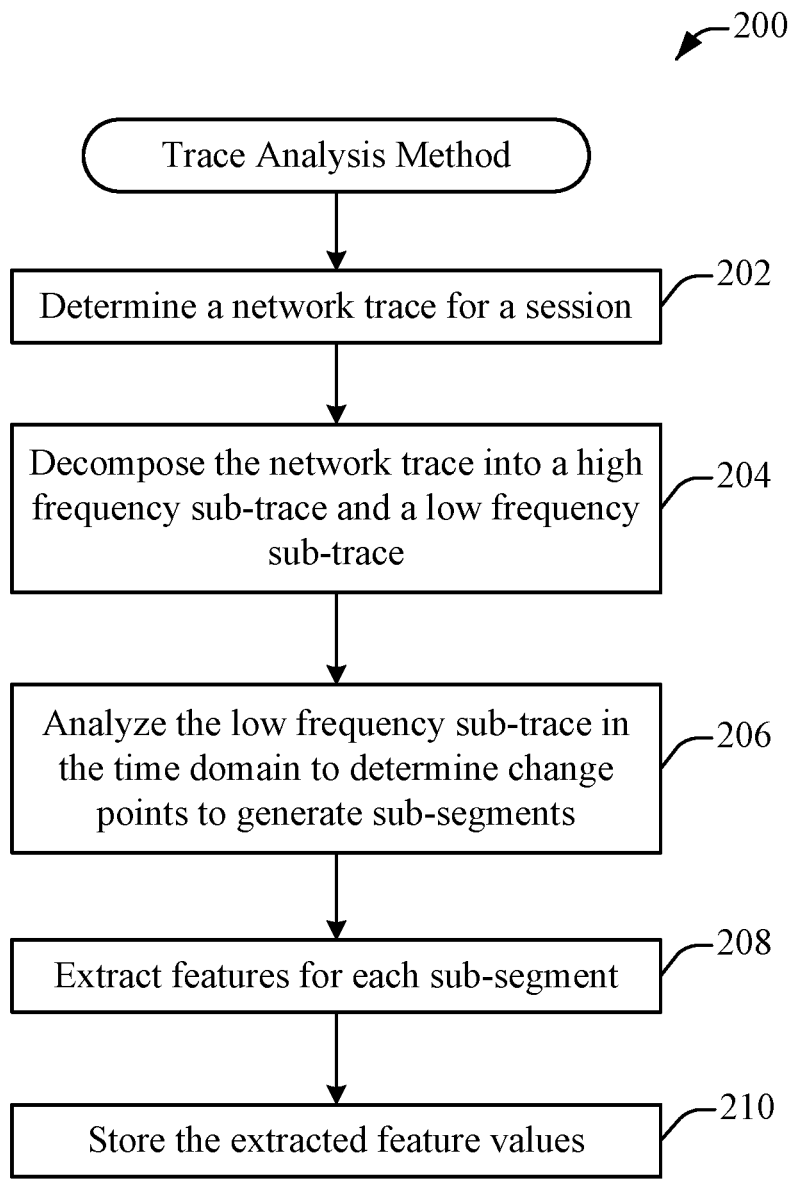
FIG. 2 depicts a simplified flowchart of a method for analyzing a network trace according to some embodiments.

FIG. 2 depicts a simplified flowchart 200 of a method for analyzing a network trace according to some embodiments. At 202, network trace analyzer 108 determines a network trace for a session. In some embodiments, the network trace includes information from samples that are sent multiple times during a session. Each network trace sample may include information about metrics for the network conditions at different moments in time during the session. The samples may be organized in a format, such as a structured format. Within the sample, values for metrics that are associated with network conditions may be included, such as a timestamp, a round trip time, a bandwidth, but other metrics may also be included. The time stamp may be used to determine a time period in which the measurements for the bandwidth and the round trip time are associated. Table I shows an example of a network trace that includes multiple samples.

TABLE I

```
{
    "session_id": "1234567890"
    "start_time": "2023-05-09T10:00:00",
    "end_time": "2023-05-09T10:11:00",
    "samples" [
        {
            "timestamp": "2023-05-09T10:00:01",
            "rtt": 50,
            "bandwidth": 10
        },
        {
            "timestamp": "2023-05-09T10:05:01",
            "rtt": 55
            "bandwidth": 8
        },
        {
            "timestamp": "2023-05-09T10:10:03",
            "rtt": 60,
            "bandwidth": 12
        },
    ]
}
```

In Table I, the network trace may include a session ID (session_id) that identifies the playback session, a start time (start_time) that indicates the start time of the playback session, and an end time (end_time) that indicates an end time of the playback session. Then, the samples may be summarized where each sample may include a timestamp and values for metrics of the network conditions, such as round trip time (rtt) and bandwidth. A timestamp may indicate the time in which the network conditions that were measured are based. The time in this case may be a start time and the measurements are performed until the next timestamp. The value may be determined in different ways by a network device, such as using a single reading, an average of multiple readings, a maximum or minimum of multiple readings, etc. The round trip time may be the amount of time it takes a communication between content delivery network 106 and client device 104 to make a round trip, such as from client device 104 to content delivery network 106 and back to client device 104, or vice versa. The bandwidth may be the measured bandwidth (e.g., throughput) that is measured for sending the content from content delivery network 106 to client device 104 at the time. For example, the bandwidth may be 10 Mbps (Megabits per second) for the first network sample and the round trip time is 50 milliseconds. These values may be the average values during the time period of 10:00:01 to 10:05:02.

At 204, network trace analyzer 108 decomposes the network trace into multiple components. For example, network trace analyzer 108 may decompose a metric, such as bandwidth, into a high frequency sub-trace and a low frequency sub-trace. During a playback session, fluctuation in network conditions may impact the streaming experience, which may lead to negative results, such as rebuffering. For example, bandwidth fluctuation or longer round trip times may impact the streaming experience. However, not all fluctuations have the same effect on the quality of service of the session. While a sharp fluctuation with a sudden drop and rapid recovery of available bandwidth may not disrupt the data that is being stored in the buffer for playback, a deep fluctuation lower in bandwidth that takes a significant amount of time to recover may be harmful and affect the quality of service, such as causing a re-buffer by not providing enough data to the buffer over time. To distinguish between different types of fluctuations that may affect the quality of service, network trace analyzer 108 may decompose the network trace into two sub-traces, such as a high frequency sub-trace and a low frequency sub-trace. Although two components are described here, other numbers of components may be appreciated, such as three sub-traces if three sub-traces are representative of different types of fluctuations. If round trip time is being used, then a time threshold may be used as a dividing line threshold between a longer round trip time and a shorter round trip time. A longer round trip time may affect the quality of service more than the shorter round trip time. In some embodiments, a dividing line may be X time units, such as three seconds, four seconds, 20 seconds, etc. The round trip time may be decomposed into a high round trip time above three seconds and a low round trip time below three seconds. The high round trip time may have a higher chance of causing rebuffering, but the low round trip time may have a lower chance of causing rebuffering. Network trace analyzer 108 may analyze the high round trip time.

The determination of the two sub-traces may be based on a threshold. When a high frequency sub-trace and a low frequency sub-trace is used, the threshold may be a dividing line between two frequency bands, which may be set at a frequency, such as 1/60 Hertz, but other frequencies may be used.

To determine the high frequency sub-trace and the low frequency sub-trace, the following may be performed. Network trace analyzer 108 may convert the network information from the network trace into the frequency domain. For example, a Fast Fourier Transform, (FFT), may be used to transform the bandwidth (bw) into the frequency domain. Then, network trace analyzer 108 may decompose the signal into a low frequency sub-trace and a high frequency sub-trace based on the threshold, such as using the following:

$$bw_{fft} = FFT(bw)$$
$$bw_{fftlow} = bw_{fft}(bw_{fft} < 1/60 \text{ Hz})$$
$$bw_{ffthigh} = bw_{fft}(bw_{fft} > 1/60 \text{ Hz}).$$

The value of $bw_{fft}$ is the Fast Fourier Transform of the bandwidth, bw. The value of $bw_{fftlow}$ is the low frequency sub-trace and the value of $bw_{ffthigh}$ is the high frequency sub-trace. The low frequency sub-trace includes frequency values that are less than a threshold that divides the network trace into sub-traces, such as 1/60 Hz. For example, the low frequency sub-trace includes frequency values that are meet the threshold (e.g., are less than 1/60 Hz), and the high frequency sub-trace includes frequency values that do not meet the threshold (e.g., are greater than 1/60 Hz). Given the nature of the network trace with multiple samples from a session being received, calculating the conversion from the time domain to the frequency domain could be realistically be done in the mind in a timely manner.

After decomposition, the Inverse Fast Fourier Transform (IFFT) of the low frequency sub-trace and the high frequency sub-trace may convert the low frequency sub-trace and the high frequency sub-trace back to the time domain, such as follows:

$$bw_{low} = \text{iFFT}(bw_{fftlow})$$

$$bw_{high} = \text{iFFT}(bw_{ffthigh}).$$

Figure 3:
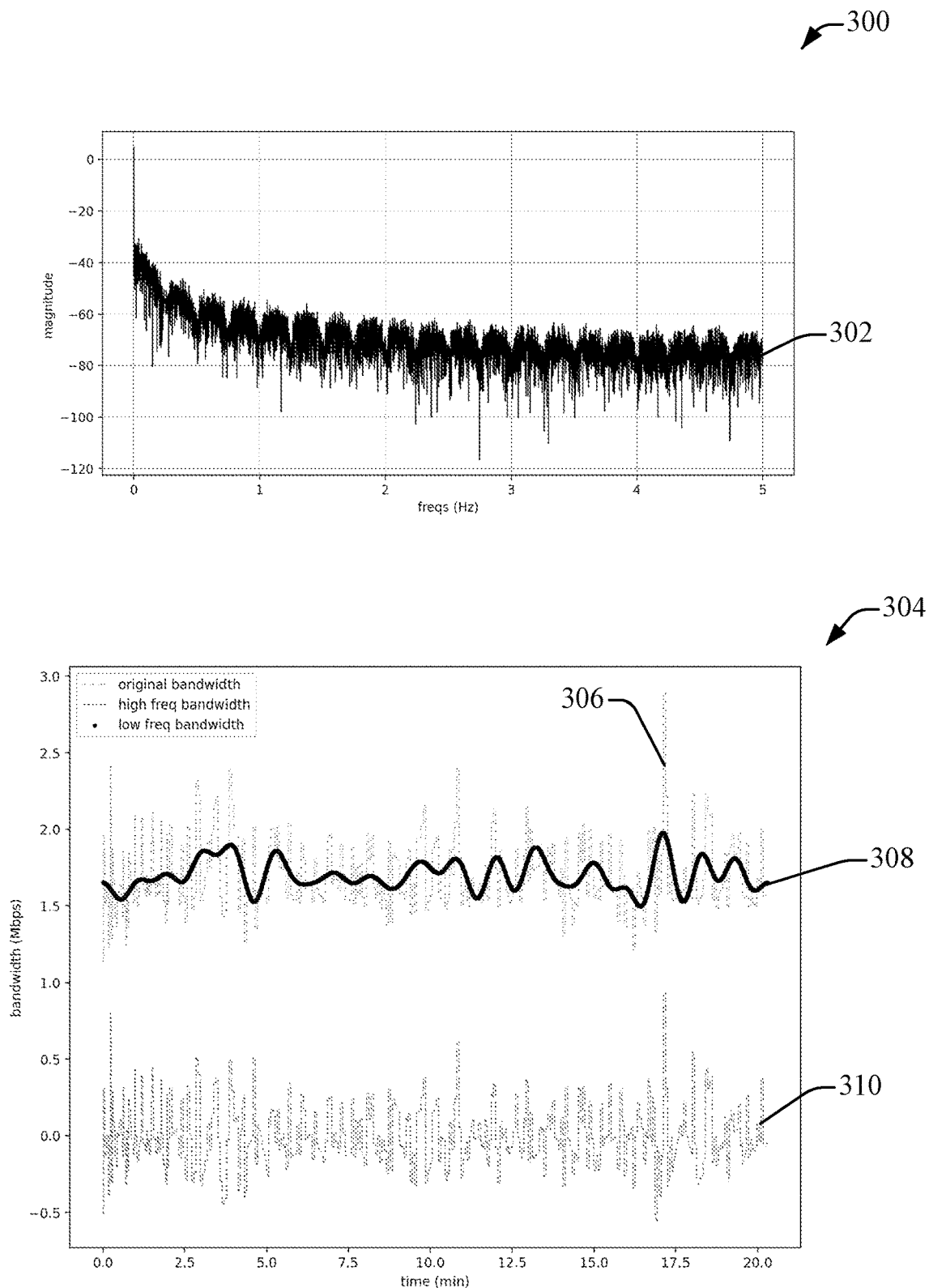
FIG. 3 shows an example of the decomposition process according to some embodiments.

The value of $bw_{low}$ is the Inverse Fast Fourier Transform (IFFT) of the low frequency sub-trace and value of $bw_{high}$ is the Inverse Fast Fourier Transform (IFFT) of the high frequency sub-trace. This separates the low frequency sub-trace and the high frequency sub-trace in the time domain. An example of the decomposition of the low frequency sub-trace and the high frequency sub-trace is shown in FIG. 3.

At 206, network trace analyzer 108 analyzes the low frequency sub-trace in the time domain to determine change points to generate sub-segments. The analysis of the low frequency sub-trace may improve the speed of the calculations described herein and use less resources. For example, removing the high frequency sub-trace may allow for the more impactful low frequency sub-trace to be analyze without the high frequency sub-trace, which is not as impactful. Less data is also analyzed, which results in a faster computation. The ending categorization may also be more accurate because the low frequency sub-trace is used. The change point detection may be used to identify significant shifts in the low frequency sub-trace. The low frequency sub-trace may be considered a combination of multiple smooth sub-segments with change points in between the sub-segments. A respective sub-segment may have similar characteristics. For example, a sub-segment may represent a period of relatively stable bandwidth behavior. The effect on the quality of service performance may be analyzed for each sub-segment.

The process of change-point detection may traverse the low frequency sub-trace and identify points where there is a noticeable change in the value of the attribute, such as bandwidth, before and after the point. The change may be measured based on a threshold. An example of the change point detection process is described in FIG. 4.

At 208, network trace analyzer 108 extracts features for each sub-segment. The features that are extracted may be related to the performance of the session. Some features include the categories of basic information, bandwidth change, and low bandwidth. The following are an example of features, but other features may be used. The features may be based on values that are determined from the entire network trace or values of one or more sub-segments for the network trace. For example, duration is the value of the duration of the network trace. However, the duration of extremely bad bandwidth is based on sub-segments, such as the sum of duration of sub-segments with average bandwidth<200 kbps.

The following features may be extracted, but is not limited to these features and other features may be used, and variations in thresholds may also be appreciated:

Duration—duration of the network trace.
Average bandwidth: average throughput in low frequency sub-trace.
STD of Bandwidth: standard deviation of throughput in low-frequency sub-trace.
CV of Bandwidth: the coefficient of variation of throughput in low frequency sub-trace.
Max RTT: the maximum RTT.
Average RTT: the average RTT.
Attempts of long RTT: attempts of RTT>3s.

Bandwidth Change
Change rate: the number of sub-segments per hour.
Max drift amplitude: max (peak-trough) of the low frequency sub-trace.
Average drift amplitude: avg (peak-trough) of the low frequency sub-trace.

Low Bandwidth
Duration of extremely bad bandwidth: sum of duration of sub-segments with average bandwidth<200 kbps.
Proportion of extremely bad bandwidth: Duration of extremely bad bandwidth/low frequency sub-trace duration.

At 210, network trace analyzer 108 stores the extracted feature values. The extracted feature values may be used in the categorization process that is described in FIG. 5.

As described in 204, the network trace may be decomposed into the low frequency sub-trace and the high frequency sub-trace. FIG. 3 shows an example of the decomposition process according to some embodiments. A graph 300 depicts a bandwidth trace and a graph 304 depicts a low frequency sub-trace and a high frequency sub-trace. Graph 300 includes a magnitude on the Y-axis and a frequency on the X-axis. Graph 300 shows the network trace when it is converted to the frequency domain. A network trace 302 represents values based on the change in the bandwidth in the frequency domain.

In graph 304, the Y-axis is the bandwidth and the X-axis is time. When network trace is decomposed into the low frequency sub-trace and the high frequency sub-trace in the frequency domain, the low frequency sub-trace and the high frequency sub-trace may be converted back to the time domain as shown in graph 304. For example, at 306, the original network trace is shown for bandwidth. Then, at 308, the low frequency sub-trace for bandwidth is shown, and at 310, the high frequency sub-trace for bandwidth is shown. The low frequency sub-trace may gradually move around 1.5 Mbps of bandwidth. The high frequency sub-trace may have sharp fluctuations around 0.0 Mbps. If this was a single sub-segment, another sub-segment may have a low frequency sub-trace that may gradually move around another bandwidth value, such as 3 Mbps. However, the high frequency sub-trace may still have sharp fluctuations around 0.0 Mbps. The sub-segments isolate times with stable bandwidth and that is why the low frequency sub-trace may be relatively stable in a sub-segment, but change between sub-segments. However, the high frequency sub-trace may not change between sub-segments. Thus, changes in the low frequency sub-trace may be noticeable, but changes in the high frequency sub-trace may not be noticeable from sub-segment to sub-segment.

Figure 4:
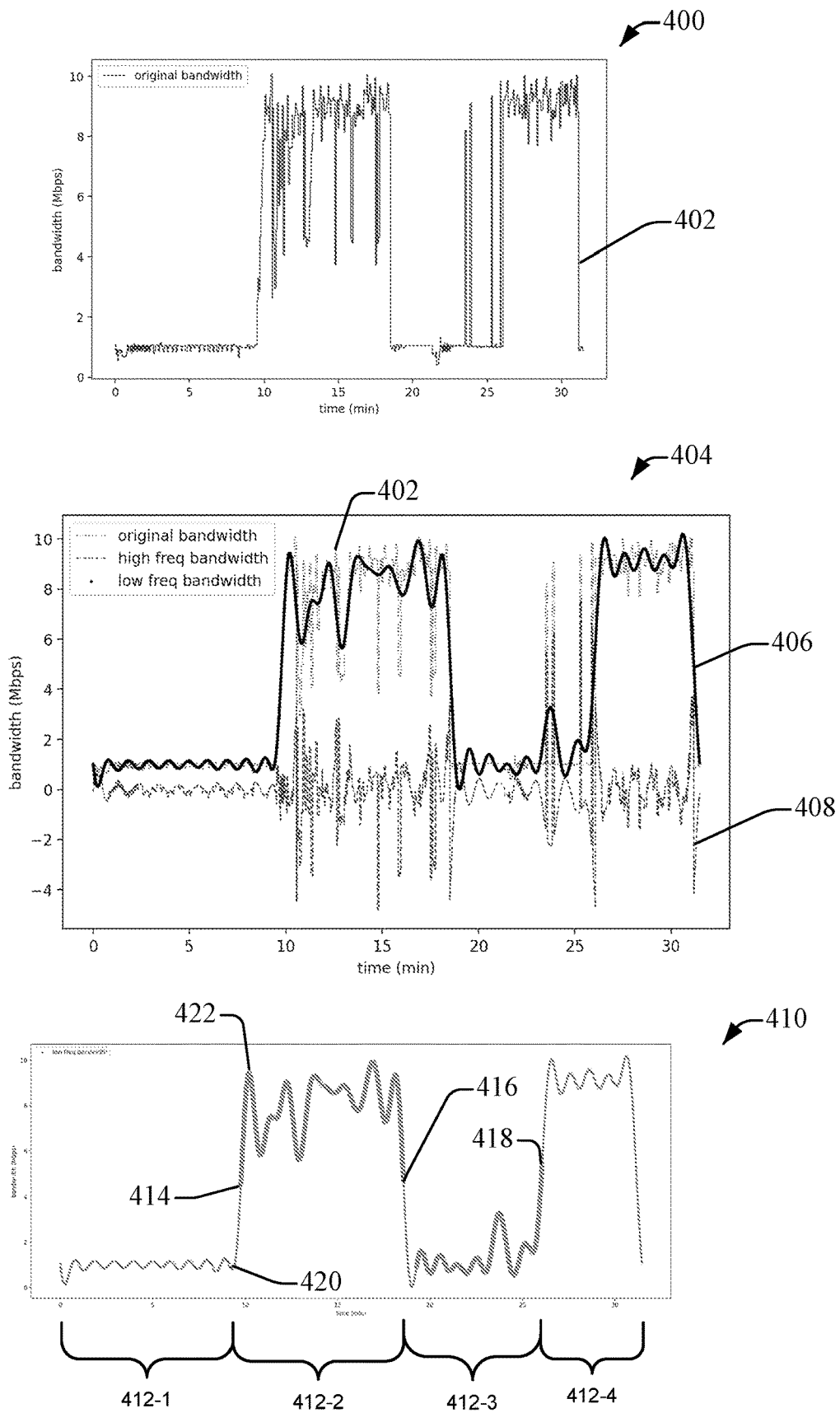
FIG. 4 depicts an example of determining a change point according to some embodiments.

As described in 206, change point detection is performed. FIG. 4 depicts an example of determining a change point according to some embodiments. A graph 400 shows an example of the original network trace. Graph 400 includes bandwidth on the Y axis and time on the X axis. A signal 402 shows the values of the network trace over time.

A graph 404 shows the low frequency sub-trace, the high frequency sub-trace, and the original network trace. Graph 404 includes bandwidth on the Y axis and time on the X axis. The original network trace is shown at 402, the low frequency sub-trace is shown at 406, and the high frequency sub-trace is shown at 408.

To determine change points, the low frequency sub-trace is isolated and analyzed for change points. A graph 410 shows the identification of change points according to some embodiments. For example, change points may be detected at 414, 416, and 418. At these change points, before the change point and after the change point include noticeable changes in bandwidth. For example, a segment at 412-1 includes bandwidth that is relatively stable around 1 Mbps. Then, a segment 412-2 includes bandwidth that oscillates around 8 Mbps. A segment 412-3 then includes bandwidth that is around 2 Mbps. Then, a segment 412-4 includes bandwidth 9 Mbps. Accordingly, the bandwidth values before the change points and after the change points vary above a threshold. This forms sub-segments of the low frequency sub-trace at 412-1, 412-2, 412-3, and 412-4. In some embodiments, the following may be used to determine change points, but other methods may be used to determine a change point:

$$\text{peak} > 2*\text{trough and (peak} - \text{trough)} > 10 \text{ Mbps}$$

$$\text{peak} > 3*\text{trough}$$

When traversing the low frequency sub-trace, for any adjacent peak and trough, if one of the above statements is true, the middle point of the peak and trough may be regarded as a change point. For example, for change point 414, the peak at 422 may be at around 9 Mbps and the trough at 420 may be around 1 Mbps. The peak is greater than 3 times the trough—9 Mbps>3*1 Mbps. Other methods may be used to determine the change points also, such as a rate of change that is above a threshold.

The following will now describe the categorization process.

Network Trace Categorization

Figure 5:
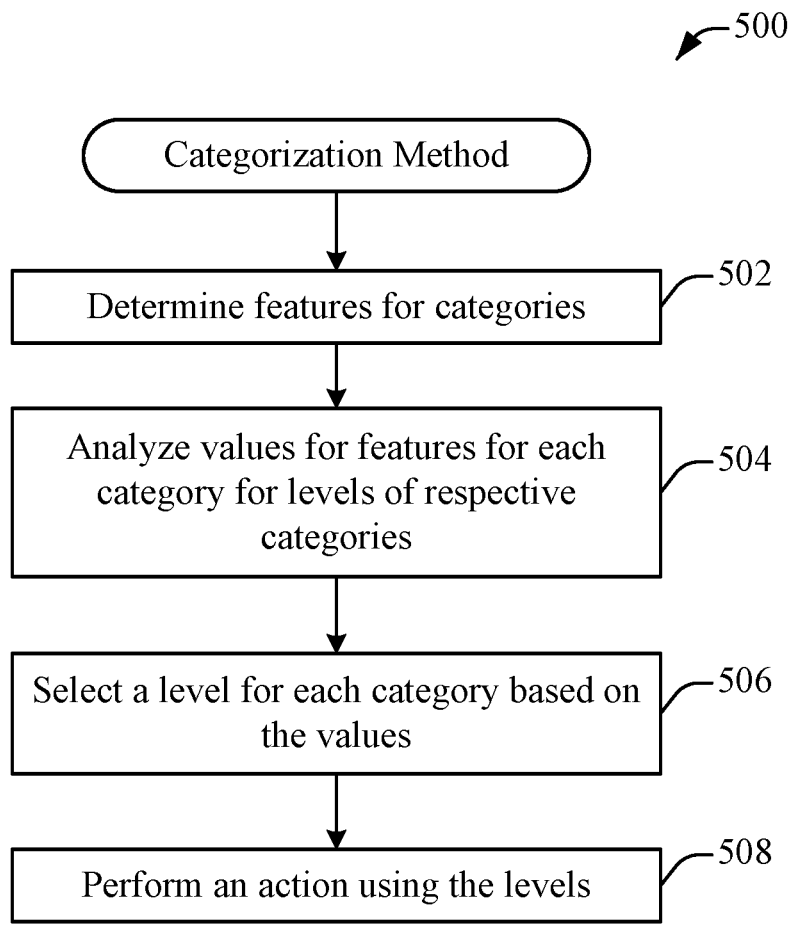
FIG. 5 depicts a simplified flowchart method for category categorizing the network trace according to some embodiments.

FIG. 5 depicts a simplified flowchart 500 method for category categorizing the network trace according to some embodiments. The categorization may categorize the entire network trace, a portion of the network trace, or individual sub-segments. The following will use network trace as an example, but portions of the network trace or sub-segments can be categorized also. For example, network trace analyzer 108 may categorize the sub-segments, and can analyze the proportion of sub-traces under different network conditions, such as 5% of bandwidth is under 1 Mbps, 30% of bandwidth is over 50 Mbp, etc. At 502, the features for the categories are determined. For example, the categories may be defined as bandwidth level, stability, and round trip time type, but other categories may be used. The bandwidth level may be a fundamental factor that assesses the overall magnitude of bandwidth during a network trace and can classify the network trace into levels, such as low, medium, and high bandwidth.

Bandwidth stability may be used to understand the variability and reliability of the network connection in a session. The bandwidth stability may be categorized into different stability levels, such as stable, fluctuating, unstable, but other levels may be used. By examining the stability of the bandwidth, the identification of minimal or significant bandwidth fluctuations is possible. The categorization of bandwidth stability also assists in evaluating the network stability to maintain a consistent and reliable connection, which enables targeted enhancements to improve the streaming performance.

Round trip time may measure the round trip time for sending communications between client device 104 and content delivery network 106. The round trip time may be classified into different levels based on latency, such as a long level, an occasionally long level, or a normal round trip time, but other levels may be used. The classification of round trip time offers valuable insights into the responsiveness of the network during the session. This may enable service providers to identify sessions with potential latency issues and perform actions to mitigate the issues.

At 504, network trace analyzer 108 analyzes the values for the features for each category to determine levels for the respective categories. For example, network trace analyzer 108 may apply rules for the categories to the values of the features. In some embodiments, the rules may include thresholds that are compared to the values for the features for each level. In general, level 1 is better for quality of service and a better viewing experience, level 2 is worse than level 1, and level 3 is the worst for quality of service and a poor viewing experience.

For bandwidth level, the following may be different levels:
  Level 3: Low bandwidth
    Average bandwidth<1 Mbps or Duration of extremely bad bandwidth>150s
    QoS property: very likely to cause rebuffering and poor viewing quality
  Level 2: Medium bandwidth
    otherwise
    QoS property: less rebuffering and medium viewing quality
  Level 1: High bandwidth, which almost has no rebuffering
    Average bandwidth>25 Mbps and Duration of extremely bad bandwidth<150s
    QoS property: almost no rebuffering and high viewing quality Level 3 may be low bandwidth, level 2 may be medium bandwidth, and level 1 may be high bandwidth. Different rules may be applied to determine the level for the network trace. For example, if the average bandwidth is less than a value, such as 1 Mbps, or the duration of extremely bad bandwidth is greater than a value, such as 150 seconds, then network trace analyzer 108 categorizes the sub-segment in level 3 with low-bandwidth. This may be low bandwidth because the average bandwidth is generally low, or the duration of extremely bad bandwidth is long. Also, if the average bandwidth is greater than a value, such as 25 Mbps, and the duration of extremely bad bandwidth is less than a value, such as 150 seconds, then network trace analyzer 108 classifies the sub-segment in level 1, which is high-bandwidth. This may be high bandwidth because the average bandwidth is generally high, and the duration of extremely bad bandwidth is short. Otherwise, network trace analyzer 108 classifies the sub-segment in level 2 with medium bandwidth. Different quality of service characteristics may be associated with the levels. For example, level 1 is associated with almost no rebuffering and high viewing quality because of the high bandwidth, level 2 is associated with less rebuffering and medium viewing quality, and level 3 is very likely to cause rebuffering or poor viewing quality because of the low bandwidth that is available.

For bandwidth stability, the following rules may be applied to determine the level:
  Level 3: Unstable
    CV of Bandwidth>0.5 or change rate>30 or max_drift_amplitude>10 Mbps
    QoS property: easy to cause rebuffering
  Level 2: Fluctuating
    otherwise
    QoS property: less rebuffering
  Level 1: Stable
    CV of Bandwidth<0.1 and change rate<5 or max_drift_amplitude<5 Mbps
    QoS property: almost no rebuffering Level 3 may be unstable bandwidth, level 2 may be fluctuating bandwidth, and level 1 may be stable bandwidth. Different rules may be applied to determine the level for the network trace. For level 3, if the CV of bandwidth is greater than a value, such as 0.5 Mbps, or the change rate is greater than a value, such as 30 Mbps, or the max drift amplitude is greater than a value, such as 10 Mbps, network trace analyzer 108 classifies the sub-segment in level 3, unstable. The bandwidth may be unstable due to the larger variability of the bandwidth as measured by the feature values. Also, if the CV of bandwidth is less than a value, such as 0.1 Mbps, and the change rate is less than a value, such as 5 Mbps, or the max drift amplitude is less than a value, such as 5 Mbps, then network trace analyzer 108 classifies the sub-segment in level 1, stable. The bandwidth may be stable due to the slight variability of the bandwidth as measured by the feature values. Otherwise, network trace analyzer 108 classifies the sub-segment in level 2, fluctuating. Level 3 may indicate an unstable bandwidth stability that may be easy to cause rebuffering, level 2 indicates a fluctuating bandwidth stability that may cause less rebuffering, level 1 indicates a stable bandwidth stability that may cause almost no rebuffering.

For RTT type, the following rules may be applied to determine the level:
  Level 3: Long RTT
    Average RTT>=3s or Max RTT>=10s
    QoS property: easy to cause rebuffering
  Level 2: Occasional long RTT
    Attempts of long RTT>1
    QoS property: may cause rebuffering
  Level 1: normal RTT
    otherwise
    QoS property: less rebuffering Level 3 may be a long round trip time, level 2 may be an occasionally long round trip time, and level 1 may be a normal round trip time. For level 3, if the average round trip time is greater than or equal to a time, such as 3 seconds, or the max round trip time is greater than or equal to a second time greater than the first time, such as 10 seconds, network trace analyzer 108 classifies the sub-segment in level 3, long RTT. These feature values may indicate that round trip times are longer. If the attempts of long round trip time is greater than a number, such as one, then network trace analyzer 108, classified sub-segment in level 2, occasional long RTT. This may indicate that round trips times may occasionally be long. Otherwise, network trace analyzer 108 classifies the sub-segment in level 1, normal RTT. Level 3 may indicate a long round trip time that may be easier to cause rebuffering, level 2 may indicate an occasionally long round trip time that may cause rebuffering, and level 1 may indicate a normal round trip time that may cause less rebuffering.

At 506, network trace analyzer 108 selects a level for each category based on the values. For example, values for the network trace are applied to the rules to select a level for each category. In some examples, a first network trace may be classified in bandwidth level 2, bandwidth stability level 2 and RTT type level 3. A second network trace may be classified in bandwidth level 3, bandwidth stability level 3 and RTT type level 3. A third network trace may be classified in bandwidth level 1, bandwidth stability level 1 and RTT type level 1.

At 508, network trace analyzer 108 performs an action using the levels. The action may be performed differently depending on how the categorization is used.

Figure 6:
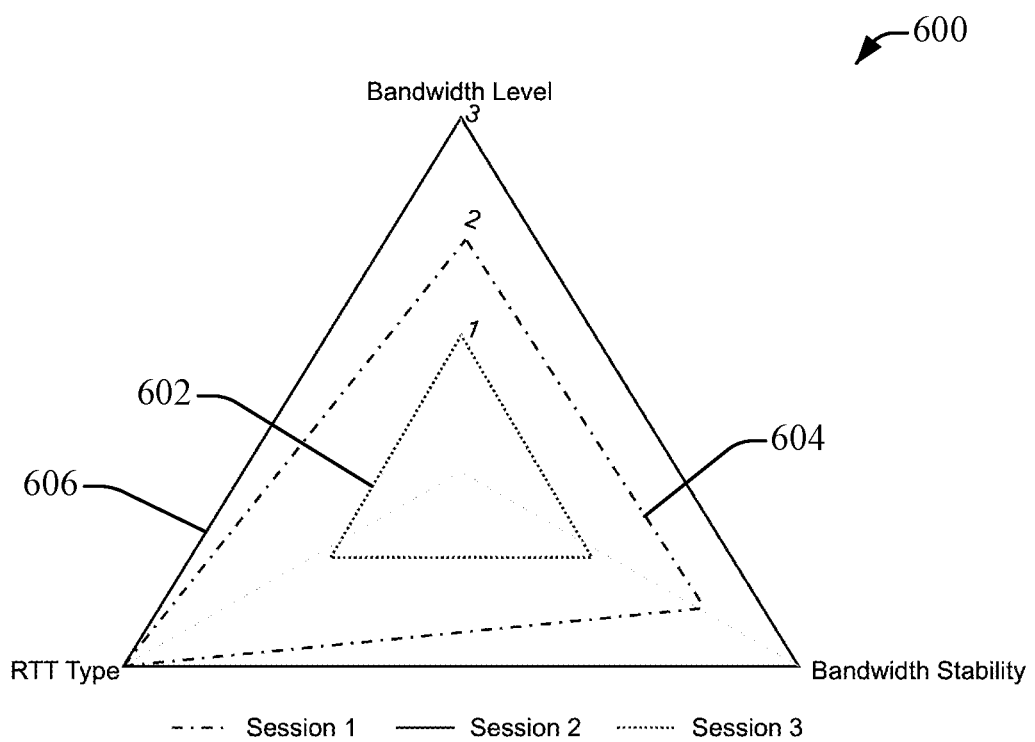
FIG. 6 depicts an example of a radar chart according to some embodiments.

In some embodiments, for the action, network trace analyzer 108 may generate a visualization for the categorization. Different visualizations may be appreciated. For example, a radar chart may be used. FIG. 6 depicts an example of a radar chart 600 according to some embodiments. The radar chart may be a way of displaying multivariate data with three or more variables represented on axes that radiate from a central point. Radar chart 600 includes the three categories of bandwidth level, bandwidth stability, and RTT type at respective points. Values of 0, 1, 2, 3 on the axes correspond to the level in which the network trace was classified. For example, at 602, a network trace for a session 3 shows that bandwidth level has a value of level 1, a bandwidth stability has a value of level 1, and a RTT type has a value of level 1. At 604, a network trace for a session 1 shows that bandwidth level has a value of level 2, a bandwidth stability has a value of level 2, and a RTT type has a value of level 3. At 606, a network trace for a session 2 shows a bandwidth level of 3, a bandwidth stability of 3, and around RTT type of 3. If level 1 is considered better than the other levels for all the categories, then it can be determined which session had the more desirable feature values. For example, session 3 shows a pattern that is closer to the center axis of zero and may have the best quality of service.

Figure 7:
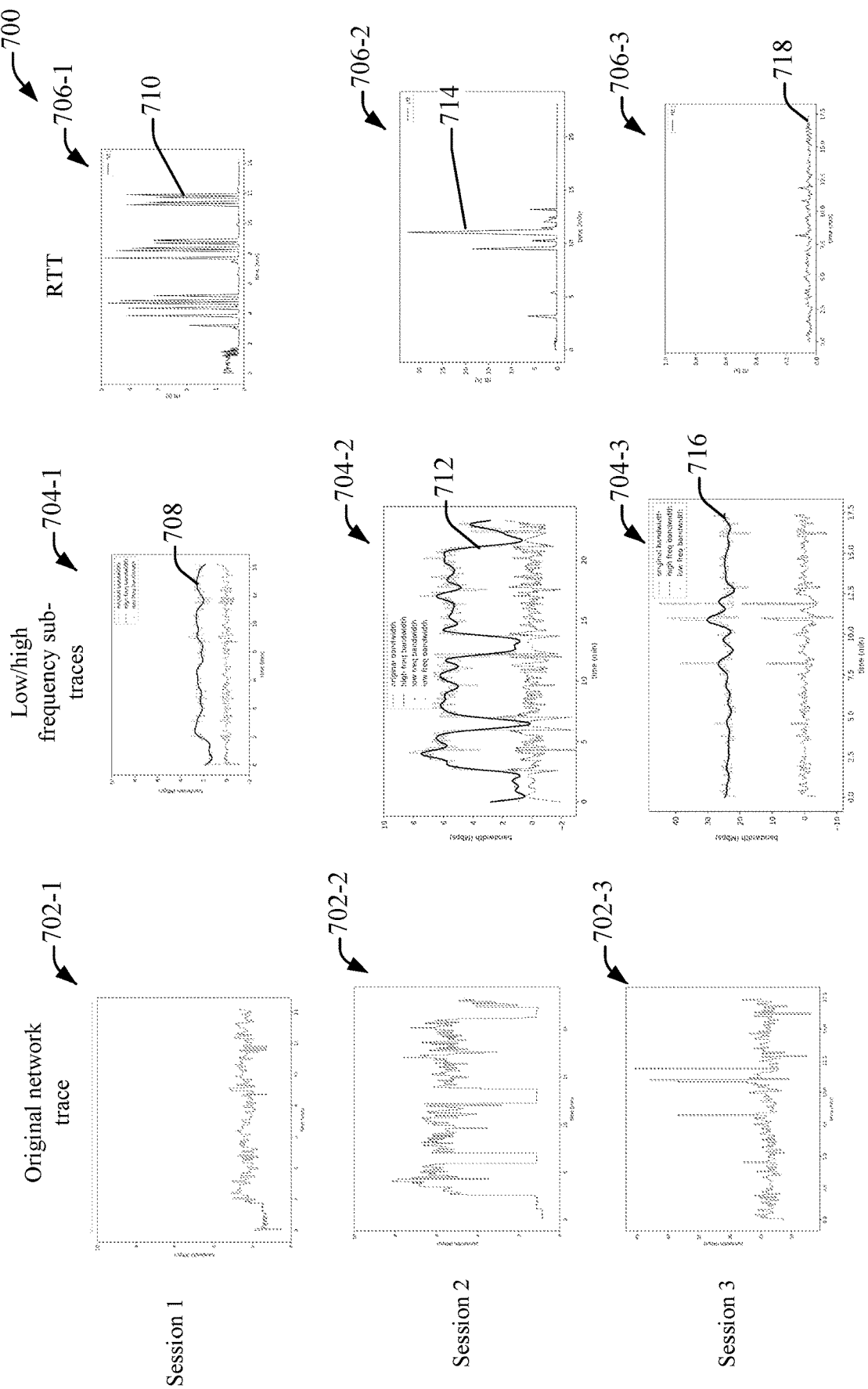
FIG. 7 depicts an example that describes characteristics of sessions 1, 2, and 3 according to some embodiments.

FIG. 7 depicts an example 700 that describes characteristics of sessions 1, 2, and 3 according to some embodiments. Sessions 1, 2, and 3 are shown with respective graphs for original network traces, low frequency sub-traces and high frequency sub-traces, and round trip time. For example, original network traces are shown at 702-1, 702-2, and 702-3 for sessions 1, 2, and 3, respectively. Low frequency and high frequency sub-traces are shown at 704-1, 704-2, 704-3 for sessions 1, 2, and 3, respectively. Then, round trip times are shown for session 1, session 2, and session 3 at 706-1, 706-2, and 706-3, respectively. The original network trace may measure the bandwidth on the Y-axis over time on the X-axis. The low frequency and high frequency sub-traces may measure the bandwidth on the Y-axis over time on the X-axis. The round trip time may measure the time on the Y-axis and the time on the X-axis.

Session 1 may include a high bandwidth, a stable bandwidth, and a normal round trip time. For example, at 708, the low frequency sub-trace is high and relatively stable. Also, at 710, the round trip time is normal. In session 2, the low frequency sub-trace is medium bandwidth and fluctuating at 712. Also, at 714, the round trips times may be long. For session 3, the low frequency sub-trace may show high bandwidth, which is stable at 716. Also, the round trip time may be normal at 718.

Figure 8:
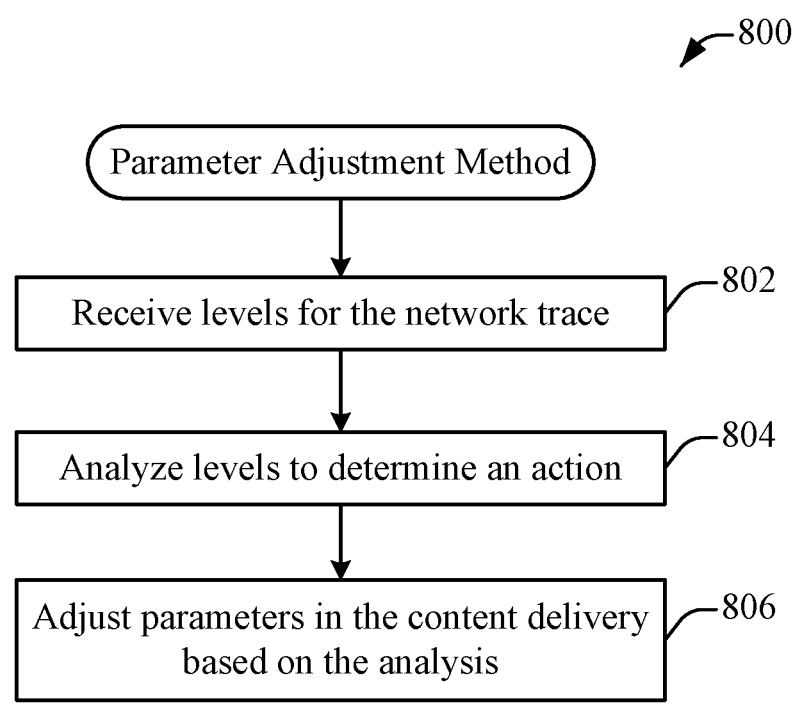
FIG. 8 depicts a simplified flowchart of a method for adjusting parameters according to some embodiments.

In other embodiments, parameters may be adjusted in processes that are used to perform content delivery. For example, FIG. 8 depicts a simplified flowchart 800 of a method for adjusting parameters according to some embodiments. At 802, network trace analyzer 108 receives levels for the network trace. The levels may be determined for one or more network traces.

At 804, network trace analyzer 108 analyzes the levels to determine in action. The analysis may be determined in different ways. For example, network trace analyzer 108 may input the levels for each network trace of a session into a prediction network. The prediction network may output an action, such as a value for changing a parameter in a process. If adaptive bitrate algorithm 110 is to be adjusted, then the prediction network may output a new value for the parameter. For example, the new value for a parameter may adjust adaptive bitrate algorithm 110 to be less aggressive in switching to a higher bandwidth profile if the levels indicate low bandwidth is being experienced. The use of the categories and levels may improve the prediction because the prediction can be performed faster. For example, the prediction network may be trained faster because prediction network learns how to apply levels to adjust the parameters. The number of levels may be significantly less compared to analyzing the low frequency sub-trace itself to determine how to adjust the parameters. This makes training the prediction network faster. Also, the prediction may be performed faster because the logic of analyzing the levels may be simpler compared to having to analyze the low frequency sub-trace. The above logic may also be applied to adjust a parameter of a content delivery network selection. For example, a content delivery network that is experiencing low bandwidth may have a parameter adjusted such that this content delivery network is not selected as much.

At 806, network trace analyzer 108 adjusts parameters in the content delivery process based on the analysis. For example, network trace analyzer 108 may send a parameter configuration to client device 104 to adjust a parameter for adapted bitrate algorithm 110. Also, common network trace analyzer 108 may adjust a parameter that is used to select content delivery networks to service requests.

The categorization may also be used in other aspects of the delivery of content. For example, for quality optimization, a service provider may use the categories to gain insight into the network conditions during playback sessions. By analyzing the low frequency sub-trace and identifying significant network changes, the service provider can optimize the content delivery processes to adapt to varying network conditions and ensure a high quality streaming experience for users.

The categorization process may also be used to compare networks. For example, the exploration analysis of network differences between different regions, content delivery networks, platforms, and devices may be provided. Service providers can use this information to identify areas with poor network conditions and prioritize optimization efforts in those areas.

The categorization may also be used in troubleshooting and diagnostics. The categories may provide a deep understanding of the relationship between quality of service and network traces. By correlating quality of service metrics with specific network conditions, service providers can identify and address issues that may affect the user experience. For example, quality of service metrics may be retrieved for a session. For each sub-segment or network trace, a quality of service metric may be associated with the levels of the categories. In some embodiments, a sub-segment or network trace may include a high number of re-buffers. This may be correlated with an unstable bandwidth stability or low bandwidth, or long round trip time.

CONCLUSION

The categorization method provides many advantages. For example, simple statistics are not relied on. The categorization method provides a more granular analysis of session level network traces. The use of the low frequency sub-trace may capture more quality of service dependent properties that may affect the viewing experience. A clear connection between the quality of service and network traces may also be provided. The relationship between quality of service metrics and the network trace properties may facilitate a deeper understanding of how network conditions impact the viewing experience.

System

Figure 9:
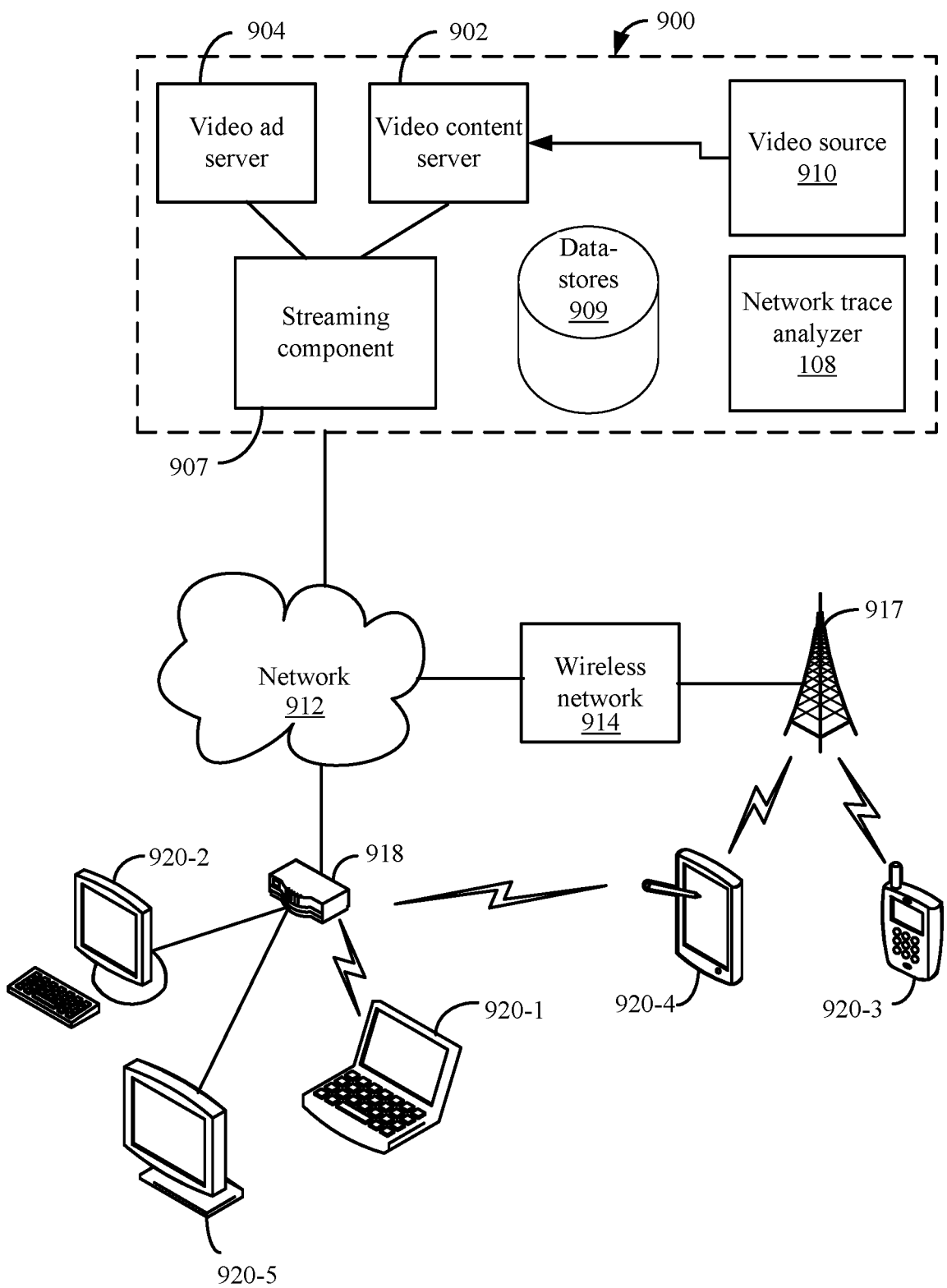
FIG. 9 depicts a video streaming system in communication with multiple client devices via one or more communication networks according to one embodiment.

Features and aspects as disclosed herein may be implemented in conjunction with a video streaming system 900 in communication with multiple client devices via one or more communication networks as shown in FIG. 9. Aspects of the video streaming system 900 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 900, video data may be obtained from one or more sources for example, from a video source 910, for use as input to a video content server 902. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 900 may include one or more computer servers or modules 902, 904, and 907 distributed over one or more computers. Each server 902, 904, 907 may include, or may be operatively coupled to, one or more data stores 909, for example databases, indexes, files, or other data structures. A video content server 902 may access a data store (not shown) of various video segments. The video content server 902 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 904 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 900, a public service message, or some other information. The video advertising server 904 may serve the video advertising segments as directed by a user interface controller (not shown).

The video streaming system 900 also may include network trace analyzer 108.

The video streaming system 900 may further include an integration and streaming component 907 that integrates video content and video advertising into a streaming video segment. For example, streaming component 907 may be a content server or streaming media server. A controller (not shown) may determine the selection or configuration of advertising in the streaming video based on any suitable algorithm or process. The video streaming system 900 may include other modules or units not depicted in FIG. 9, for example, administrative servers, commerce servers, network infrastructure, advertising selection engines, and so forth.

The video streaming system 900 may connect to a data communication network 912. A data communication network 912 may comprise a local area network (LAN), a wide area network (WAN), for example, the Internet, a telephone network, a wireless network 914 (e.g., a wireless cellular telecommunications network (WCS)), or some combination of these or similar networks.

One or more client devices 920 may be in communication with the video streaming system 900, via the data communication network 912, wireless network 914, or another network. Such client devices may include, for example, one or more laptop computers 920-1, desktop computers 920-2, "smart" mobile phones 920-3, tablet devices 920-4, network-enabled televisions 920-5, or combinations thereof, via a router 918 for a LAN, via a base station 917 for wireless network 914, or via some other connection. In operation, such client devices 920 may send and receive data or instructions to the system 900, in response to user input received from user input devices or other input. In response, the system 900 may serve video segments and metadata from the data store 909 responsive to selection of media programs to the client devices 920. Client devices 920 may output the video content from the streaming video segment in a media player using a display screen, projector, or other video output device, and receive user input for interacting with the video content.

Distribution of audio-video data may be implemented from streaming component 907 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file.

Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 907 may communicate with client device 920 using control messages and data messages to adjust to changing network conditions as the video is played. These control messages can include commands for enabling control functions such as fast forward, fast reverse, pausing, or seeking to a particular part of the file at the client.

Since streaming component 907 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 907 may use TCP-based protocols, such as HyperText Transfer Protocol (HTTP) and Real Time Messaging Protocol (RTMP). Streaming component 907 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 10:
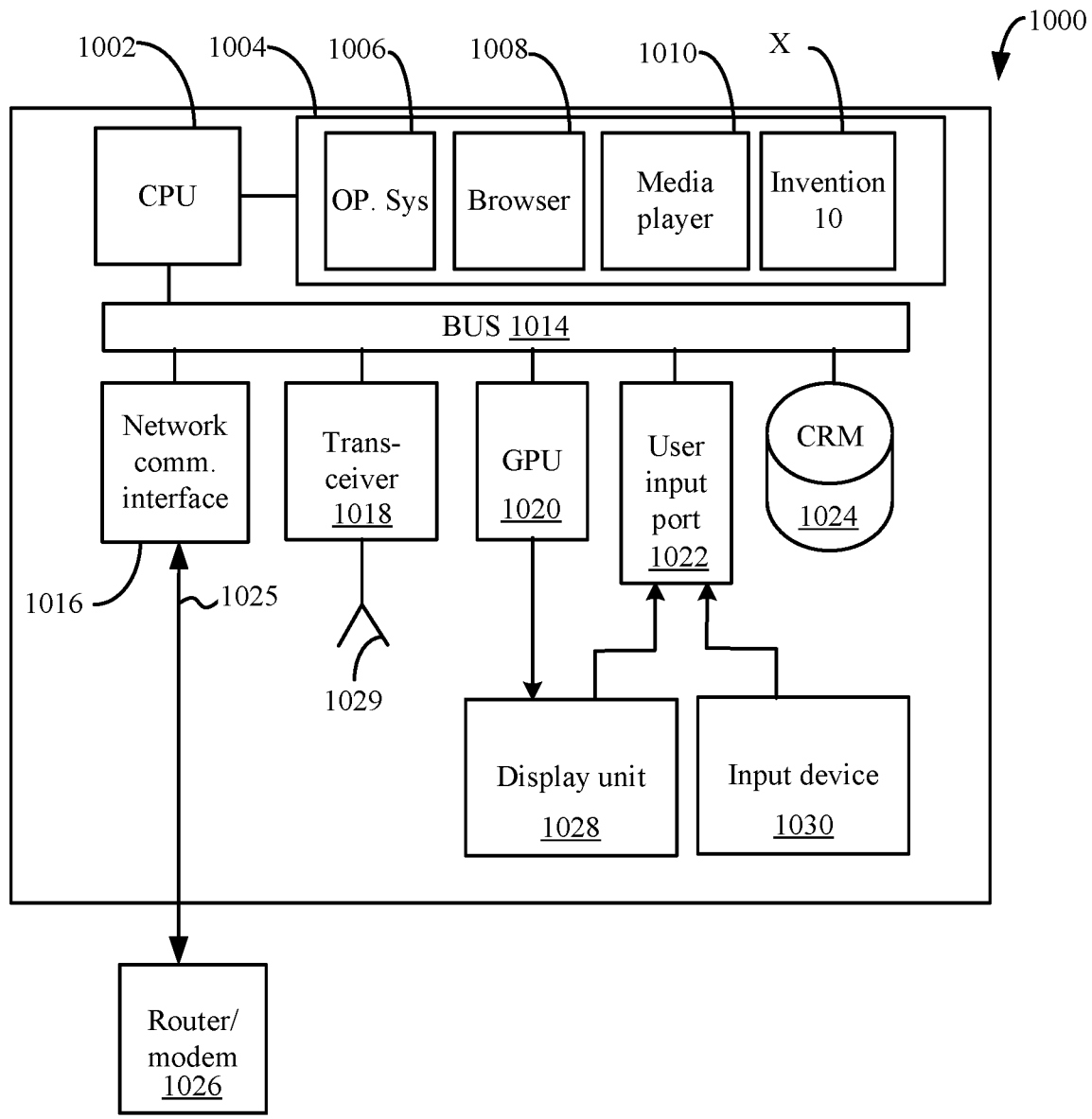
FIG. 10 depicts a diagrammatic view of an apparatus for viewing video content and advertisements.

Referring to FIG. 10, a diagrammatic view of an apparatus 1000 for viewing video content and advertisements is illustrated. In selected embodiments, the apparatus 1000 may include a processor (CPU) 1002 operatively coupled to a processor memory 1004, which holds binary-coded functional modules for execution by the processor 1002. Such functional modules may include an operating system 1006 for handling system functions such as input/output and memory access, a browser 1008 to display web pages, and media player 1010 for playing video. The memory 1004 may hold additional modules not shown in FIG. 10, for example modules for performing other operations described elsewhere herein.

A bus 1014 or other communication components may support communication of information within the apparatus 1000. The processor 1002 may be a specialized or dedicated microprocessor configured or operable to perform particular tasks in accordance with the features and aspects disclosed herein by executing machine-readable software code defining the particular tasks. Processor memory 1004 (e.g., random access memory (RAM) or other dynamic storage device) may be connected to the bus 1014 or directly to the processor 1002, and store information and instructions to be executed by a processor 1002. The memory 1004 may also store temporary variables or other intermediate information during execution of such instructions.

A computer-readable medium in a storage device 1024 may be connected to the bus 1014 and store static information and instructions for the processor 1002; for example, the storage device (CRM) 1024 may store the modules for operating system 1006, browser 1008, and media player 1010 when the apparatus 1000 is powered off, from which the modules may be loaded into the processor memory 1004 when the apparatus 1000 is powered up. The storage device 1024 may include a non-transitory computer-readable storage medium holding information, instructions, or some combination thereof, for example instructions that when executed by the processor 1002, cause the apparatus 1000 to be configured or operable to perform one or more operations of a method as described herein.

A network communication (comm.) interface 1016 may also be connected to the bus 1014. The network communication interface 1016 may provide or support two-way data communication between the apparatus 1000 and one or more external devices, e.g., the streaming system 900, optionally via a router/modem 1026 and a wired or wireless connection 1025. In the alternative, or in addition, the apparatus 1000 may include a transceiver 1018 connected to an antenna 1029, through which the apparatus 1000 may communicate wirelessly with a base station for a wireless communication system or with the router/modem 1026. In the alternative, the apparatus 1000 may communicate with a video streaming system 900 via a local area network, virtual private network, or other network. In another alternative, the apparatus 1000 may be incorporated as a module or component of the system 900 and communicate with other components via the bus 1014 or by some other modality.

The apparatus 1000 may be connected (e.g., via the bus 1014 and graphics processing unit 1020) to a display unit 1028. A display 1028 may include any suitable configuration for displaying information to an operator of the apparatus 1000. For example, a display 1028 may include or utilize a liquid crystal display (LCD), touchscreen LCD (e.g., capacitive display), light emitting diode (LED) display, projector, or other display device to present information to a user of the apparatus 1000 in a visual display.

One or more input devices 1030 (e.g., an alphanumeric keyboard, microphone, keypad, remote controller, game controller, camera, or camera array) may be connected to the bus 1014 via a user input port 1022 to communicate information and commands to the apparatus 1000. In selected embodiments, an input device 1030 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1028, for example using a touch sensitive screen. A cursor control device may communicate direction information and command selections to the processor 1002 and control cursor movement on the display 1028. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving a network trace from a playback session of a delivery of content being managed by a content management system, wherein the network trace captures network conditions during the delivery of the content;
   decomposing the network trace into a low frequency sub-trace and a high frequency sub-trace based on a threshold, wherein the threshold is used to divide the network trace into the low frequency sub-trace and the high frequency sub-trace, wherein decomposing the network trace comprises:
      converting the network trace into the low frequency sub-trace and the high frequency sub-trace from a time domain to a frequency domain; and
      converting the low frequency sub-trace to the time domain;
   extracting a value for a feature for the network trace based on the low frequency sub-trace;
   classifying the network trace into a category based on the value; and
   performing an action based on the category for the content management system.

2. The method of claim 1, wherein receiving the network trace comprises receiving the network trace from a device that measures values that are included in the network trace during the delivery of the content.

3. The method of claim 1, wherein decomposing the network trace comprises:
   using the threshold to determine the network trace is a low frequency sub-trace and is a high frequency sub-trace in the frequency domain.

4. The method of claim 1, further comprising:
   analyzing the low frequency sub-trace to determine sub-segments based on change points that are detected in the low frequency sub-trace.

5. The method of claim 4, wherein analyzing the low frequency sub-trace to determine sub-segments comprises:
   traversing the low frequency sub-trace to determine changes in the low frequency sub-trace that meet a second threshold.

6. The method of claim 4, wherein analyzing the low frequency sub-trace to determine sub-segments comprises:
   determining a peak of the low frequency sub-trace;
   determining a trough of the low frequency sub-trace; and
   analyzing the peak and the trough to determine if a second threshold is met to determine a change point occurred.

7. The method of claim 4, wherein the value is based on one or more values for one or more sub-segments.

8. The method of claim 1, wherein extracting the value for the feature comprises:
   extracting a plurality of values for a plurality of features for trace low frequency sub-trace.

9. The method of claim 8, wherein classifying the network trace into the category comprises:
   using the plurality of values to determine the category.

10. The method of claim 1, wherein classifying the network trace into the category comprises:
    determining a plurality of categories;
    determining a level for categories in the plurality of categories; and
    using the level for the categories to perform the action.

11. The method of claim 10, wherein determining the level for categories in the plurality of categories comprises:
    selecting a level for each category in the plurality of categories to determine the action.

12. The method of claim 10, wherein performing the action comprises:
    using the level for the plurality of categories to adjust a parameter that is used for delivery of content.

13. The method of claim 12, wherein the parameter is used for a selection of a bitrate in an adaptive bitrate algorithm or selection of a content delivery network to process a request for content.

14. The method of claim 10, wherein performing the action comprises:
    generating a visualization on a display using the respective level for the plurality of categories.

15. The method of claim 1, wherein performing the action comprises:
    correlating quality of service information for the network trace to the category.

16. A non-transitory computer-readable storage medium having stored thereon computer executable instructions, which when executed by a computing device, cause the computing device to be operable for:
    receiving a network trace from a playback session of a delivery of content being managed by a content management system, wherein the network trace captures network conditions during the delivery of the content;

decomposing the network trace into a low frequency sub-trace and a high frequency sub-trace based on a threshold, wherein the threshold is used to divide the network trace into the low frequency sub-trace and the high frequency sub-trace, wherein decomposing the network trace comprises:

converting the network trace into the low frequency sub-trace and the high frequency sub-trace from a time domain to a frequency domain; and converting the low frequency sub-trace to the time domain;

extracting a value for a feature for the network trace based on the low frequency sub-trace;

classifying the network trace into a category based on the value; and performing an action based on the category for the content management system.

17. The non-transitory computer-readable storage medium of claim 16, further operable for:

analyzing the low frequency sub-trace to determine sub-segments based on change points that are detected in the low frequency sub-trace.

18. An apparatus comprising:
one or more computer processors; and
a computer-readable storage medium comprising instructions for controlling the one or more computer processors to be operable for:

receiving a network trace from a playback session of a delivery of content being managed by a content management system, wherein the network trace captures network conditions during the delivery of the content;

decomposing the network trace into a low frequency sub-trace and a high frequency sub-trace based on a threshold, wherein the threshold is used to divide the network trace into the low frequency sub-trace and the high frequency sub-trace, wherein decomposing the network trace comprises:

converting the network trace into the low frequency sub-trace and the high frequency sub-trace from a time domain to a frequency domain; and converting the low frequency sub-trace to the time domain;

extracting a value for a feature for the network trace based on the low frequency sub-trace;

classifying the network trace into a category based on the value; and performing an action based on the category for the content management system.

* * * * *